United States Patent
Frank et al.

(10) Patent No.: US 11,872,637 B2
(45) Date of Patent: Jan. 16, 2024

(54) BORING TOOL

(71) Applicant: AB SANDVIK COROMANT, Sandviken (SE)

(72) Inventors: Peter Frank, Schmalkalden (DE); Christian Liebaug, Schmalkalden (DE)

(73) Assignee: AB Sandvik Coromant, Sandviken (SE)

( * ) Notice: Subject to any disclaimer, the term of this patent is extended or adjusted under 35 U.S.C. 154(b) by 264 days.

(21) Appl. No.: 17/415,937

(22) PCT Filed: Dec. 19, 2019

(86) PCT No.: PCT/EP2019/086287
§ 371 (c)(1),
(2) Date: Jun. 18, 2021

(87) PCT Pub. No.: WO2020/127717
PCT Pub. Date: Jun. 25, 2020

(65) Prior Publication Data
US 2022/0072626 A1  Mar. 10, 2022

(30) Foreign Application Priority Data
Dec. 20, 2018 (EP) ..................... 18214626

(51) Int. Cl.
*B23B 29/03* (2006.01)
*B23B 29/034* (2006.01)

(52) U.S. Cl.
CPC .. *B23B 29/03403* (2013.01); *B23B 2260/146* (2013.01)

(58) Field of Classification Search
CPC ........ B23B 29/03404; B23B 29/03414; B23B 29/03407; B23B 29/034; B23B 29/03; B23B 2260/108; B23B 2260/107
See application file for complete search history.

(56) References Cited

U.S. PATENT DOCUMENTS 2,669,890 A * 2/1954 Tao ................... B23B 29/03407
                                                     408/232
2,990,730 A    7/1961 Clement
2,998,736 A    9/1961 Cloutier et al.
(Continued)

FOREIGN PATENT DOCUMENTS

EP    3222375 A1 *  9/2017  ....... B23B 29/03439
EP    3222375 A1    9/2017

*Primary Examiner* — Alan Snyder
(74) *Attorney, Agent, or Firm* — Corinne R. Gorski

(57) ABSTRACT

A boring tool has a slider member connected to a cutting insert seat, the slider member is arranged movably inside a tool body of the boring tool along a path extending transversely to a rotation axis of the boring tool for adjusting the distance of the of the cutting insert seat in relation to the rotation axis. A wedge-shaped clamping member is connected to a drive unit and arranged inside the tool body. The wedge-shaped clamping member is in contact with the slider member for clamping the slider member into a locked position, in which locked position, the wedge-shaped clamping member is pre-loaded to passively lock the slider member. The drive unit is controllable such that the wedge-shaped clamping member is actively releasable when adjusting the distance of the cutting insert seat.

10 Claims, 2 Drawing Sheets

(56) References Cited

U.S. PATENT DOCUMENTS

| | | | | |
|---|---|---|---|---|
| 3,710,659 | A * | 1/1973 | Pagella | B23B 29/03435 |
| | | | | 82/131 |
| 4,003,670 | A * | 1/1977 | Ewing | B23B 29/03407 |
| | | | | 408/185 |
| 4,761,103 | A * | 8/1988 | Krstovic | B23B 29/03407 |
| | | | | 407/45 |
| 5,909,986 | A | 6/1999 | Kaiser et al. | |
| 7,614,326 | B2 * | 11/2009 | Peltonen | B23B 51/0426 |
| | | | | 408/59 |
| 8,684,638 | B2 * | 4/2014 | Buck | B23B 29/03407 |
| | | | | 408/16 |
| 9,033,623 | B2 * | 5/2015 | Nakamura | B23B 35/00 |
| | | | | 408/1 R |
| 9,999,928 | B2 | 6/2018 | Paul et al. | |
| 2012/0269590 | A1 | 10/2012 | Buck | |
| 2018/0250753 | A1 | 9/2018 | Frank | |

* cited by examiner

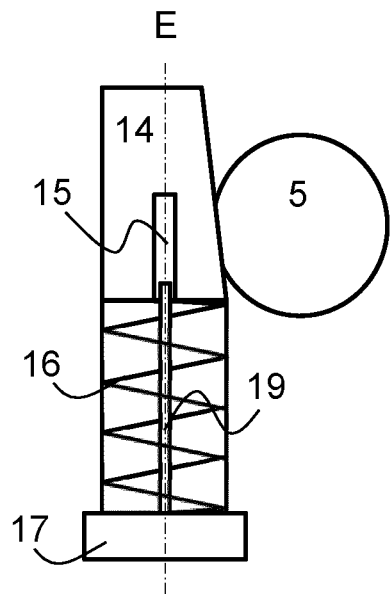
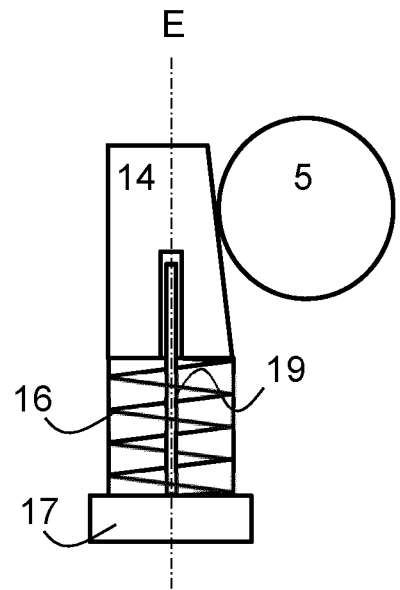
Fig. 3a      Fig. 3b
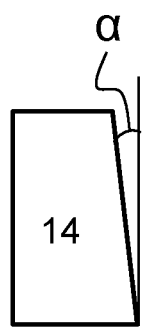
Fig. 4 ical element arranged to clamp the adjusting pin
BORING TOOL

RELATED APPLICATION DATA

This application is a § 371 National Stage Application of PCT International Application No. PCT/EP2019/086287 filed Dec. 19, 2019 claiming priority to EP 18214626.6 filed Dec. 20, 2018.

TECHNICAL FIELD

The present invention relates generally to a boring tool and especially a boring tool in which a seat for holding a cutting insert is movable in relation to a rotation axis of the boring tool, such that the cutting diameter of the boring tool may be adjusted.

BACKGROUND ART

A boring tool is typically used for enlarging an already existing hole by means of rotating a tool body provided with one or more cutting inserts. The process is commonly performed in order to achieve accurate dimensions, tight tolerances or a certain surface finish. Typical boring tool bodies are often supplied with a radially adjustable cutting edge that enables a variable cutting diameter as well as the possibility to compensate for wear of the cutting insert.

Traditionally, the adjustment of the cutting diameter is done manually by the machine operator, through e.g. turning an adjustment screw on the tool body. In environments where there are high demands for productivity manual adjustment of boring tools is considered time consuming and therefore highly undesirable. Manual adjustment requires that an operator physically stops the machining operation and physically contacts the boring tool.

In recent years the adjustment of boring tools has been more automated. One example of such an automated boring tool is disclosed in EP 3222375, in which a boring tool includes a slider member which is arranged movably inside the tool body along a path that extends transversely to a rotation axis of the boring tool. A motor is connected to the slider member and controllable such that the slider member is movable transversely to the rotation axis for changing the distance of the cutting edge of the cutting insert and thereby adjust the cutting diameter of the boring tool body. Such a boring tool further comprises a control unit configured to control the motor to adjust the slider member. Providing the boring tool with such a motor and control unit eliminates the need for operators to physically reach into the machine or remove the boring tool from the machine to adjust the tool diameter. This means that the adjustment procedure for a boring tool is considerably faster, more robust and more secure.

U.S. Pat. No. 9,999,928 discloses a setting system for a boring tool wherein an actuating device comprises an electric actuator that exerts a force on an adjusting pin carrying an insert, for adjusting the radial position of the insert. The actuator and all other components are integrated in the boring tool. There is also disclosed a clamping unit for clamping the adjusting pin. The clamping unit is realized as a piezoelectric element arranged to clamp the adjusting pin when no voltage is supplied to the piezoelectric element. When the piezoelectric element is energized it releases the adjusting pin such that the radial position may be adjusted. A problem with piezoelectric elements is that they are expensive, complicated and not so reliable.

In light of the above there is a need to further develop a boring tool and especially ways to efficiently keep and fixate the position of the means for adjusting the cutting diameter, such that the cutting diameter will remain constant during the machining process.

SUMMARY OF INVENTION

An object of the present invention is to provide a boring tool of the type defined in the introduction being improved in at least some aspect with respect to such boring tools already known.

This object is accomplished by a boring tool comprising a tool body, which includes a front end and a rear end, between which a central rotation axis extends around which the tool body is rotatable in a direction of rotation. The boring tool comprises a slider member connected to a cutting insert seat and is arranged movably inside the tool body along a path extending transversely to said rotation axis for adjusting the distance of the of the cutting insert seat in relation to the rotation axis. The boring tool further comprises a wedge-shaped clamping member that is connected to a drive unit and arranged inside the tool body and in contact with the slider member for clamping the slider member into a locked position, in which locked position, the wedge-shaped clamping member is pre-loaded to passively lock the slider member, and the drive unit is controllable such that the wedge-shaped clamping member is actively releasable when adjusting the distance of the cutting insert seat.

Thanks to the wedge-shaped clamping member being preloaded towards the locked position, the function of the drive unit is mainly to bring the clamping member to desired positions, while the clamping force is obtained by means of the preloading force. With the inventive tool, in the locked position, the clamping force does not need to be provided by the drive unit. Thereby, advantageously, the drive unit can be operated to move the clamping member, and, in the locked position, it can be ensured that a desired clamping force is present also without a force from the drive unit.

In an exemplary embodiment the wedge-shaped clamping member is arranged along an extension axis extending substantially in parallel to the central rotation axis and movable along said extension axis. In another exemplary embodiment the wedge-shaped clamping member may instead be arranged along an extension axis extending substantially in parallel to the transversal extension path of the slider member and moveable along said extension axis. In such an example embodiment, the slider member has an extension in the direction of the path from an outer end connected to the insert seat to an inner end. The clamping member is movably arranged towards and away from the slider member at the inner end thereof. In another exemplary embodiment, the clamping member may instead be arranged along an extension axis that is substantially perpendicular to the central rotation axis and to the direction of the path.

In an exemplary embodiment the wedge-shaped clamping member is pre-loaded by means of a biasing spring. Furthermore, the wedge-shaped clamping member may be provided with a threaded recess portion in a cavity of the wedge-shaped clamping member, which cavity extends along the extension axis of the wedge-shaped clamping member and in which a threaded bolt is received, which, when rotated in a first direction, causes the biasing spring to compresses by moving the wedge-shaped clamping member against the biasing force of the biasing spring to release the locked position of the wedge-shaped clamping member, and which, when rotated in a second direction, forces the wedge-shaped clamping member into clamping engagement with the slider member.

Thus, when the drive unit is operated to move the clamping member towards the locked position, the spring acts to press a first set of flanks of the threads together, i.e. the flanks of the bolt thread that face the spring and the flanks of the recess thread that face away from the spring. If the drive unit is allowed to continue to operate and to turn the bolt thread in the recess thread after the clamping member has reached the locked position, a second set of flanks of the threads will engage and press against each other. This second set of flanks include the flanks of the bolt thread that face away from the spring and the flanks of the recess thread that face the spring. Therein eventually the force between the second set of flanks may correspond to a desired clamping force between the clamping member and slider member. However, advantageously, when the clamping member has reached the locked position, the drive unit does not have to provide a force to the bolt in order for the clamping member to remain in the locked position and to ensure a defined clamping force. In other words, the flanks of the bolt thread do not have to be pressed against the corresponding flanks of the recess thread in order to apply a clamping force to the slider member. Instead, the biasing force from the spring is sufficient. Thus, in the locked position, the clamping force is provided by the biasing force from the spring and the drive unit can be turned off. In embodiments where there is a play between the flanks of the threads, the flanks can be disengaged in the locked position.

In an exemplary embodiment, the drive unit is connected to the wedge-shaped clamping member via a gear arrangement. The threaded bolt may be connected to a first gear wheel of the gear arrangement and is rotatable together with the first gear wheel and the drive unit may be connected to a second gear wheel, which may be connected to the first gear wheel. The gear ratio between the first and second gear wheel may be between 2:1 and 10:1, preferably 3:1.

In an exemplary embodiment the wedge angle of the wedge-shaped clamping member may be between 2 to 10 degrees, preferably between 5 to 6 degrees. The surface roughness of the side of the wedge-shaped clamping member that is in contact with the slider member is between 5 and 20 μm, preferably between 10 and 12 μm.

In an exemplary embodiment the boring tool further comprises a control unit configured to control the drive unit, such as an electric motor. In embodiments, the drive unit is arranged in the tool body.

BRIEF DESCRIPTION OF DRAWINGS

The invention is now described, by way of example, with reference to the accompanying drawings, in which:

FIGS. 3a and 3b are simplified side views of the wedge-shaped clamping member its interaction with the slider member.

FIG. 4 is an enlarged view of an upper part of the wedge-shaped clamping member.

DESCRIPTION OF EMBODIMENTS

Figure 1:
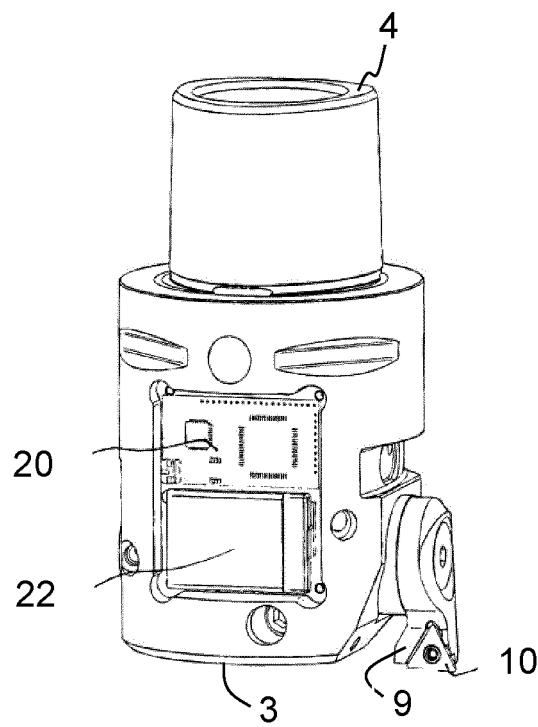
FIG. 1 is a simplified perspective view of the boring tool.

In the following, a detailed description of a boring tool according to the present invention will be made. In context of the present disclosure a boring tool is to be interpreted broadly may be used by for metal cutting, for chip removing machines and machine processes for enlarging an already existing hole. Reference will now be made in parallel to FIG. 1, FIGS. 2a and 2b and FIGS. 3a and 3b when describing the boring tool. The same reference numerals will be used for denoting the same feature in all figures. The boring tool has a tool body 2 including a front end 3 and a rear end 4, between which a central rotation axis C extends around which the tool body 2 is rotatable in a direction of rotation R. The boring tool further comprises a slider member 5, a cutting insert seat 9, a drive unit 12, a wedge-shaped clamping device 14, a biasing spring 16, a gear arrangement comprising a first gear wheel 17 and a second gear wheel 18 and a threaded bolt 19.

The slider member 5 is arranged movably inside the tool body 2 along a path P (see dashed line in FIG. 2b) extending transversely to the rotation axis C. Moving the slider member 5 may be done by means of an electric motor, not shown in the figures. In context of the present disclosure "transversely" should not be interpreted as "perpendicularly", although it in most cases may be preferred. When it comes to the movability of the slider member 5 it is important that it is movable in a direction that adjusts the distance of the cutting insert seat 9 in relation to the rotation axis C. The cutting insert seat 9 is adapted and configured to receive a cutting insert 10. Thus, by adjusting the distance of the cutting insert seat 9 also the cutting insert will be adjusted. The cutting insert 10 has a cutting edge and projects from the tool body transversely to the rotation axis C thereof so as to carry out a boring action on walls of a hole in a workpiece when rotating the tool body around the rotation axis C.

Figures 2A, 2B:
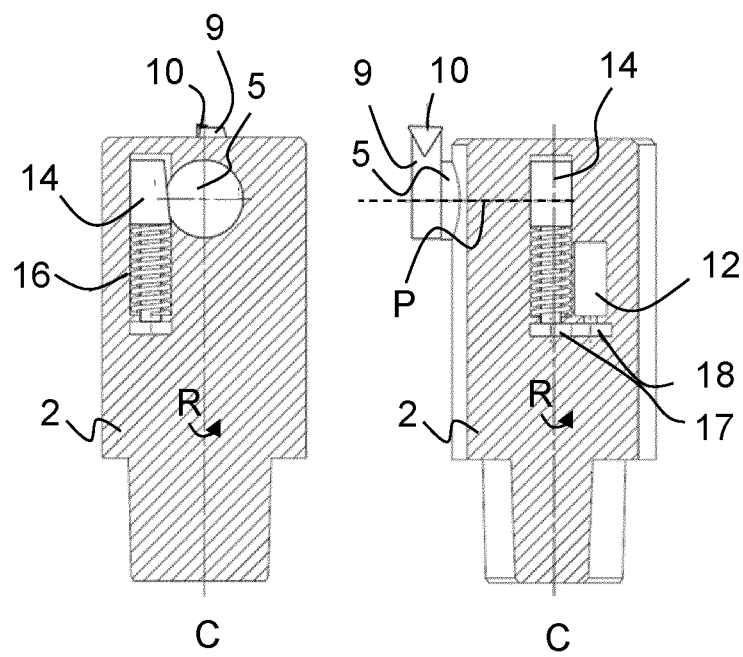
FIGS. 2a and 2b are cross-sectional side views of the boring tool.

As can be seen in FIG. 2a, the wedge-shaped clamping member 14 is arranged inside the tool body 2 such that the wedge-shaped clamping device 14 is in contact with the slider member 5. The purpose of the wedge-shaped clamping member 14 is to clamp and lock the slider member 5 into a fixed position after it has been adjusted to set the radius of the boring tool. The wedge-shaped clamping member 14 may be arranged at different positions in the boring tool as long as it is in contact with the slider member 5 and movable between a locked position, in which it clamps the slider member 5 and an open position where the slider member 5 is released, in which open position the slider member is adjustable. In an exemplary embodiment the wedge-shaped clamping member 14 is arranged along an extension axis E extending substantially in parallel to the central rotation axis C and movable along said extension axis E. This situation is shown in FIGS. 2a and 2b. In an alternative embodiment the wedge-shaped clamping member 14 is instead arranged along an extension axis E extending substantially in parallel to the transversal extension path P of the slider member and moveable along said extension axis E. Thus, the wedge-shaped clamping member 14 may be arranged in a number of different positions as long as it is capable of, in relation to the slider member 5, accomplishing a clamping action in one position and releasing action in another position.

The drive unit 12 is connected to the wedge-shaped clamping device 14 for moving the wedge-shaped clamping member 14 into a releasing position. As long as the drive unit 12 is passive, i.e. is turned off, the wedge-shaped clamping member 14 is pre-loaded for clamping the slider member 5 into a locked position. The drive unit 12 is typically an electric motor which may be connected directly to the wedge-shaped clamping member 14 or via a gear arrangement. By preloading the wedge-shaped clamping member 14 it passively locks the slider member 5 into a fixed or locked position. This, means that also the cutting insert seat 9 is in a fixed position and the boring tool is operable. The, advantage with a passive lock is that it locks independently of any power supply. An active lock may require that for example a drive unit is power-supplied for holding a clamping device in the locking position, such as when the boring tool is operating. A power failure could then lead to server damages.

In an exemplary embodiment the preloading of the wedge-shaped clamping member 14 to passively lock the slider member 5 is accomplished by means of a biasing spring 16, which urges the wedge-shaped clamping member 14 into clamping engagement with the slider member 5 (see FIG. 3a). In order to release the clamping engagement between the wedge-shaped clamping member 14 and the slider member 5, the drive unit 12 compresses the spring 19 (see FIG. 3b). The compression of the spring 19 is accomplished by providing the wedge-shaped clamping member 14 with a threaded recess portion in a cavity 15 of the wedge-shaped clamping member 14. The cavity 15 extends along the extension axis E. A threaded bolt 19 is received in the cavity 15. When the threaded bolt 19 is rotated in a first direction the biasing spring 16 will be compressed and release the locked position of the wedge-shaped clamping member 14 by moving the wedge-shaped clamping member 14 against the biasing force of the biasing spring 16. When the threaded bolt 19 is rotated in a second opposite direction it forces the wedge-shaped clamping member 14 into clamping engagement with the slider member 5.

The rotational movement of the treaded bolt 19 is accomplished by the drive unit 12, which as mentioned above may be connected directly to the threaded bolt 19 or via a gear arrangement as shown in FIG. 2b. In an exemplary embodiment the threaded bolt 19 is connected to the first gear wheel 17 of the gear arrangement and rotatable together with the first gear wheel 17 and the drive unit 12 is connected to the second gear wheel 18, which is connected to the first gear wheel 17. The gear ratio between the first and second gear wheel 17, 18 is between 2:1 and 10:1, preferably 3:1. As is understood by a person skilled in the art the gear arrangement may comprise two, three or more gears depending on the circumstances. An advantage with connecting the drive unit 12 using a gear arrangement is that the releasing force may be adapted to the biasing force of the spring by choosing a suitable gear ratio.

The boring tool also has a control unit in the form of a micro controller 20 arranged inside the tool body 2. The micro controller is configured to control the motor member to move the slider member 5 and the drive unit 12 for actively releasing wedge-shaped clamping device 14. The micro controller 20 may also be configured to communicate an external device, such as a laptop or a smart phone for receiving set values of boring diameters to be achieved by rotation of the tool body 2 and to control the motor member to move the slider member 5 to positions corresponding thereto. The micro controller 20 is configured to communicate with such an external device by any type of wireless communication means, preferably low power communication means. An electric battery 22 is also arranged inside the tool body 2 and connected to provide electric energy to the function of the micro controller 20, the motor member for the slider member 5 and the drive unit 12 for the wedge-shaped clamping member 14

Turning now to FIG. 4, some properties of the wedge-shaped clamping member 14 will be described. In order to secure an adequate clamping force, the inventors have found that the wedge angle α of the wedge-shaped clamping member 14 is between 2 to 10 degrees is suitable, preferably between 5 to 6 degrees. Moreover, the surface roughness, $R_z$, of the side of the wedge-shaped clamping member 14 that is in contact with the slider member 5 is between 5 and 20 µm, preferably between 10 and 12 µm.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein and are intended to be encompassed hereby. Moreover, it is not necessary for the boring tool to address each and every problem sought to be solved by the presently described concept, for it to be encompassed hereby. In the exemplary figures, a broken line generally signifies that the feature within the broken line is optional.

The invention claimed is:

1. A boring tool comprising:
   a tool body including a front end and a rear end, between which a central rotation axis extends around which the tool body is rotatable in a direction of rotation;
   a slider member connected to a cutting insert seat, wherein the slider member is arranged movably inside the tool body along a path extending transversely to said the rotation axis for adjusting a distance of the of the cutting insert seat in relation to the rotation axis; and
   a wedge-shaped clamping member connected to a drive unit, the wedge-shaped clamping member being arranged along an extension axis and movable along the extension axis inside the tool body and in contact with the slider member for clamping the slider member into a locked position, in which locked position, the wedge-shaped clamping member is pre-loaded by means of a biasing spring to passively lock the slider member, the drive unit being controllable such that the wedge-shaped clamping member is actively releasable when adjusting the distance of the cutting insert seat in relation to the rotation axis, wherein the wedge-shaped clamping member includes a threaded recess portion in a cavity of the wedge-shaped clamping member, the cavity extending along the extension axis, wherein a threaded bolt is received within the cavity, and wherein the threaded bolt, when rotated in a first direction, causes the biasing spring to compress by moving the wedge-shaped clamping member against the biasing force of the biasing spring to release the locked position of the wedge-shaped clamping member, and the threaded bolt, when rotated in a second direction, forces the wedge-shaped clamping member into clamping engagement with the slider member.

2. The boring tool according to claim 1, wherein the extension axis extends substantially in parallel to the central rotation axis.

3. The boring tool according to claim 1, wherein the drive unit is connected to the wedge-shaped clamping member via a gear arrangement.

4. The boring tool according to claim 3, wherein the threaded bolt is connected to a first gear wheel of the gear arrangement and rotatable together with the first gear wheel.

5. The boring tool according to claim 4, wherein the drive unit is connected to a second gear wheel, which is connected to the first gear wheel.

6. The boring tool according to claim 5, wherein the gear ratio between the first and second gear wheel is between 2:1 and 10:1.

7. The boring tool according claim 1, wherein the wedge angle of the wedge-shaped clamping member is between 2 to 10 degrees.

8. The boring tool according to claim 1, wherein the surface roughness of a side of the wedge-shaped clamping member that is in contact with the slider member is between 5 and 20 μm.

9. The boring tool according to claim 1, wherein the drive unit is an electric motor.

10. The boring tool according to claim 1, further comprising a micro controller configured to control the drive unit.

* * * * *